United States Patent [19]
Bohrn et al.

[11] Patent Number: 5,213,845
[45] Date of Patent: May 25, 1993

[54] COLORING PROCESS

[75] Inventors: Walter J. Bohrn; William D. DeSantis; Raymond C. Kent, all of Lancaster, Pa.

[73] Assignee: Armstrong World Industries, Inc., Lancaster, Pa.

[21] Appl. No.: 772,143

[22] Filed: Oct. 7, 1991

[51] Int. Cl.$^5$ ............................................. B05D 5/06
[52] U.S. Cl. ................................... 427/280; 427/384; 106/209
[58] Field of Search ................ 427/280, 384; 106/162, 106/209

[56]    References Cited
U.S. PATENT DOCUMENTS

| | | | |
|---|---|---|---|
| 2,504,117 | 4/1950 | Downs | 427/280 |
| 4,113,505 | 9/1978 | Bellanca et al. | 106/209 |
| 4,473,601 | 9/1984 | Kanatsu et al. | 427/280 |
| 4,836,853 | 6/1989 | Gribi | 106/209 |
| 5,114,485 | 5/1992 | Lynch et al. | 106/209 |

FOREIGN PATENT DOCUMENTS 754378  8/1956  United Kingdom ............... 106/209

*Primary Examiner*—David Brunsman

[57]    ABSTRACT

Variegated color and optimally textured effects are produced on substantially non-wicking surfaces by applying gel particles of at least two different colors formed from at least two alginate compositions, each containing a different color from the other and each having been mixed with a second composition containing a gelling agent to produce the particles.

8 Claims, No Drawings

COLORING PROCESS

The present invention relates to a process for producing variegated color effects on substantially non-wicking surfaces.

BACKGROUND OF THE INVENTION

Variegated color effects produced with at least two or more different colors on solid surfaces have provided aesthetically desirable tiles for flooring and ceilings as well as decorative solid wall panels. In addition, variegated color effects may be desired for coating the ceiling grids supporting ceiling tiles as well as the tiles themselves. However, the processes for producing such colored tiles, grids, panels or sheets are cumbersome, expensive and very difficult to control. Most commercial processes require extremely tight control to prevent the running of the various colors into one another with the accompanying loss of the variegated or satisfyingly speckled appearance.

THE PRIOR ART

Heretofore, variegated color effects have been obtained most successfully by using a plurality of sprayers, each containing a differently colored paint (i.e., pigment in a vehicle), to spray the various pigments onto the surface of a moving or stationary web to provide the variously colored, speckled effect on the solid surface, and then drying the resulting web. If the drying step is not substantially instantaneous, it is difficult to prevent the running of one color into another, particularly if the same vehicle is used for the various pigments.

Techniques for forming multicolor coating compositions are disclosed in a series of patents dating from the 1960's through the 1980's. Instability, difficulty in controlling particle size, sensitivity to shear are only a few of the problems that this prior art technology encountered.

U.S. Pat. No. 2,964,417 discloses the use of particles formed by solvent displacement (insolubilization) of a film forming polymer such as an acrylic resin using the same solvent as used to form the carrier phase. Examples of carrier solvents include xylol, toluol and alcohol. A colored lacquer is formed by dissolving the film former in a mixture of suitable solvents such as amyl acetate, methyl ethyl ketone, acetone and methyl isobutyl ketone. The lacquer is carefully added to the carrier solvent with slow agitation to form globules (particles) of colorant. The inability to control particle size and the presence of high flash solvents make the use of this technique less than desirable. The tendency of the particles in the composition to coalesce before being applied is also of concern.

U.S. Pat. Nos. 3,058,931 and 3,058,932 disclose a system consisting of three major parts—(1) a hydrophobic varnish (esterified dehydrated castor fatty acid containing pigment and dissolved in aromatic naptha), (2) a protective colloid such as carboxy methylcellulose and (3) an emulsion interpolymer paint latex such as an SBR rubber. Components 2 and 3 are combined together with a colorant to form an emulsion base. The pigmented varnish is added slowly to this emulsion base. Macroscopic globules of the pigmented varnish are thus formed in the emulsion base. Globule sizes up to ¼" diameter are disclosed. Use of this system is very difficult without coalescing the pigmented varnish; and the shelf life would not be expected to be sufficient for commercial utility.

U.S. Pat. No. 3,138,568 discloses a process based on the formation of an oil-in-water emulsion. A solution of a vinyl-toluene copolymer is prepared in a mixture of an aromatic hydrocarbon and mineral spirits. The outer phase is water containing clay, methyl cellulose and sodium sulfate. Both phases contain their respective colorants. A two color composition is formed by adding the solvent solution under gentle agitation to the aqueous phase; and the composition is applied to the substrate followed by forced or accelerated drying. This process suffers from instability due to coalescence of the solvent droplets, sensitivity of the phases in the composition to shear and the difficulty of controlling the size of the droplets unless only large, substantially stable droplets are formed. This process also suffers from instability of the coating at the elevated temperatures; i.e., above 300° F., that are used for forced drying.

U.S. Pat. No. 3,185,653 suffers from similar shortcomings as U.S. Pat. No. 3,138,568. In this patent, two phases are also used. A cyclized rubber dissolved in mineral spirits comprises the oil phase. The aqueous phase consists of pigment and a polyacrylate thickener/binder in water. Problems of coalescence, stability, shear sensitivity and size control are ever present.

U.S. Pat. No. 4,713,084 discloses the preparation of dye-containing alginate gel particles and a method for dyeing textiles. The disclosed process involves the use of a monovalent cation in the form of a chloride salt in combination with a polyvalent cation for forming a gel and the use of a gel breakdown agent, the polyvalent cation and the breakdown agent intended to produce liquefication of the gel and the subsequent release of the variously colored dyes into the fibers. This method that includes gel breakdown (liquefication) would be anathema for imparting distinct variegated color effects on non-pervious substrates or on substantially non-wicking, non-textile surfaces.

The principal object of the present invention is to provide variegated color effects on a non-textile surface, i.e., a surface characterized as being essentially non-wicking. Such surfaces which may also be non-porous, and may even be impervious, include surfaces of metal, ceramics, polymeric films, paper, fiberboards and the like. Another object is to provide a variety of textured effects as well as color effects on the aforementioned surfaces. It is also an object to provide compositions for use in producing these effects in which a plurality of distinct colors and/or textures can be imparted to these surfaces in the form of discrete specks of a variety of colors and/or a variety of pigment sizes. A further object is to provide such compositions that are stable, resist coalescence of the various colors, are not sensitive to shear forces and are substantially insensitive to elevated drying temperatures.

SUMMARY OF THE INVENTION

The basic compositions of the invention comprise variously colored aqueous gel particles suspended in a liquid vehicle as a slurry, each of the variously colored particles having been prepared by contacting a dispersion of each colored pigment in an alginate solution with a gelling salt solution of a polyvalent metal other than magnesium to provide a particle concentrate. The variously colored gel particles are then dispersed in a single clear coat base of a liquid having a viscosity of at least 50 cps, preferably an acrylic resin, before being applied to a non-textile surface.

While it is possible to utilize the gel particle slurries to prepare the ultimate coating compositions of this invention, it is preferred to concentrate the particles by dewatering and washing the excess salt solution from the particles; and then dispersing the concentrated gel particles in a liquid having a viscosity of 50–3000 cps, preferably 500–1500 cps, such as an acrylic or other resin base or water thickened with an agent such as a modified guar gum thickening agent.

The coating process of the invention comprises applying the coating composition containing the variety of particles of different colors, sizes (diameters) or both to the surface of the particular substrate by any of a variety of techniques including spraying, printing, rolling, etc., followed by forced drying or by merely permitting the coated surface to dry.

DETAILED DESCRIPTION

This invention relates to a multicolor coating system and the resulting variegated visual effects that can be produced on a variety of substrates. An important aspect of this invention involves the process for producing colored, aqueous gel particles. Any number of particle colors can be combined into a single coating with no tendency for the individual colors to coalesce into a single color.

In the practice of this invention, a first composition is formed by preparing a dispersion of pigment(s) in a hydrocolloid solution of an alginate. Suitable for use are alginic acid or suitable alginic acid derivatives. Suitable derivatives are alginic acid salts such as the sodium, potassium or ammonium salts that are capable of being gelled. Specific examples of alginic acid derivatives are the sodium alginates designated as Kelgin TM, the industrial grade sodium alginates designated as Keltex TM, the specially purified low calcium sodium alginates designated as Kelco TM, the refined ammonium and potassium alginates designated Superloid TM and Kelmar TM, respectively, all commercially available from the Kelco Division of Merck & Co., Inc. Particularly suitable alginic acid derivatives are the refined sodium alginates designated "Kelgin HV", "Kelgin MV", "Kelgin F", "Kelgin LV", "Kelgin XL", "Kelgin RL" and "Kelvis".

The first composition, the so-called "algin solution", will contain from about 0.5% to about 5% by weight of alginic acid or suitable alginic acid derivative. Preferably, the composition will contain from about 1% to about 2.5% of the appropriate alginic acid or alginic acid derivative. Gums or water dispersible resins can be incorporated in the first composition for the purpose of controlling viscosity, imparting film forming properties, improving stability in the final coating, etc. Examples include modified guar and locust bean gums, polyvinyl alcohol, acrylic resins, cellulosic derivatives such as carboxy methyl cellulose (CMC), hydroxy ethyl cellulose (HEC) and other similar materials.

An essential component of the first composition is the coloring agent, the pigment. Suitable pigments include both the inorganic and organic types. Examples of suitable inorganic pigments include the synthetic iron oxides, titanium dioxide, chromium and cobalt salts, copper, lead and cadmium compounds and, in particular, the appropriate oxides, molybdates, etc. Examples of organic pigments include the phthalocyanines, azo and diazo compounds, diarylides, carbazole dioxazines, pyrazolones, napthols, toluidines, dinitranilines, etc. Special effect pigments such as metallic glitters, pearlescents, etc., may also be employed.

The second composition, the so-called "salt solution", contains a gelling agent for the alginic acid or its derivatives in deionized water. Polyvalent metal salts, other than those based on magnesium, are suitable. Such salts should be readily soluble in the water and include chlorides, bromides, nitrates, sulfates, etc. Appropriate polyvalent cations include calcium, barium, aluminum and to a lesser degree, copper, nickel, zinc and cadmium. A particularly preferable gelling salt is calcium chloride because of its availability and relatively low cost.

The amount of gelling agent employed in the second composition must be sufficient to gel the algin polymer. This of course is dependent upon the concentration of algin polymer in the first composition. Although the amount can be calculated, it is generally more convenient to simply employ an excess. Employing a concentration of salt at least 1% by weight of the second composition will generally be sufficient to ensure gelling of the first composition. For example, if the gelling agent salt is calcium chloride, stoichiometrically 7.2% calcium is required based on the weight of sodium alginate. Gels, however, can be formed with as little as 30% of that amount. Further information on gelling agents and the amounts needed to form algin gels are described in the reference "Kelco Algin", 2d edition, available from the Kelco Division of Merck and Co.

In order to form gel particles, it is necessary to intimately contact the first composition with the second composition. This can be achieved in a batch process by slowly pouring the first composition into the vortex created by stirring the second composition. A more preferred method, however, is to employ a continuous process in which the two liquid streams are fed directly into a conduit and initially contact each other in a zone of moderately high turbulence. The resultant product is a slurry consisting of large gel masses of the first composition dispersed in the second composition. Before any further processing, it is preferable to wait a sufficient time to ensure complete gelation and hardening of the first composition. Generally, a period of at least ½ hour is adequate for this purpose.

In order to produce particles of a size range suitable for incorporation into a coating formulation, the gel masses should be mechanically broken down in a controlled fashion. While various equipment may be suitable, it has been found that the "Comomil" unit (Quadro Engineering) is well suited for this purpose. The "Comomil" unit consists of a V-shaped blade placed inside of a conical screen of controlled mesh and hole size. The V-blade is constructed of ¼" stainless steel rod and rotates at a high speed inside the screen. Also the clearance between the blade and screen is very small so that the gel is forced through the screen openings with a shearing or macerating action. It is easy to change hole configuration and size by simply inserting a different screen of the desired geometry. Screens having hole sizes ranging from 0.025" to 0.200", are adequate for the present invention. To form the desired gel particles, the gel mass slurry is simply poured through the "Comomil" device and collected.

As stated previously, it is possible to utilize a series of gel particle slurries so produced to prepare the coating composition. However, it is desirable to concentrate the particles by dewatering and then washing the particles.

Dewatering and washing offers greater latitude in formulating the final coating particularly where high particle concentration visuals are desired. These steps also enhance shelf life of the composition, minimize "color bleeding", and, from a practical standpoint, reduce shipping weight.

Various equipment can be used to dewater the gel particles including centrifuges, vibrating screens, vacuum filter belts, etc. Preferred is a centrifuge equipped with a water spray. A 2-5 minute spin cycle (1 minute water spray) results in a concentrated particle sludge with a dry solids content of from about 3 to 25% by weight. In this form, the particles have very good shelf life and can be stored for long periods of time prior to usage.

In order to utilize the particles to produce variegated visual effects, it is preferred to prepare a coating composition containing the desired variety of particles. Typically, such a composition contains a thickening agent to control viscosity and may also contain resin binders that will assist in adhering the particles to the substrate. The minimal formulation requirements will be dependent upon the particular application involved and its specific performance requirements. For a substrate such as a ceiling tile, the formulation can simply be particles suspended in water. Generally, the viscosity of the water should be increased by the addition of a thickener. However, for an application such as the decoration of metallic ceiling grid, there are rather stringent processing and durability requirements that usually necessitate using tough resin binders. Such resins serve to improve adherence of the particles to the substrate. They are typically cross-linked and have a Tg (glass transition temperature) above room temperature.

The amount of particles incorporated into a coating formulation will depend upon the application method, the coverage rate and the visual effect desired. Typically, however, the amount can range from as little as about 2% up to about 50% on a wet solids basis.

In the preparation of a particle coating formulation, several factors should be considered:

1. High shear mixing for prolonged periods must be avoided.
2. Highly alkaline pH conditions should be avoided. An optimum pH range is 5-7.5.
3. Highly polar, water soluble solvents should be kept to a minimum.
4. The concentration of monovalent cations should be kept to a minimum, preferably zero.

The shelf life and the stability of the final compositions are significantly improved if monovalent salts are omitted.

The invention will be more clearly understood by referring to the examples that follow. In the examples, all parts and percentages are by weight unless otherwise noted.

EXAMPLE 1

A 1% by weight solution of sodium alginate was prepared by adding 30 g of "Kelgin MV"[b] to 2970 g of deionized water. After 2 hours of mixing, a clear solution having a Brookfield viscosity of about 350 cps was obtained. Three 400 g aliquots of the alginate solution were taken to prepare the following three (3) color dispersions:

White—4% $TiO_2$; 16 g R-901[a] in 400 g of 1% "Kelgin MV"[b]

Gray—2% pigment loading; 6 g R-901[a]; 2 g "Ferro black V-302"[c] in 400 g of 1% "Kelgin MV"[b]

Brown—2% total pigment loading; 0.8 g Type 3003[d] red; 3.6 g Type 5200 blue[d] and 3.6 g Type 1060 yellow[d] - in 400 g of 1% "Kelgin MV"[b]

[a] A product of E. I. duPont de Nemours & Company
[b] A product of Kelco Division of Merck & Company
[c] A product of Ferro Corporation
[d] A product of Degussa Company A second composition (gelling salt solution) was prepared as follows:

0.5% calcium chloride (7.5 g)
5.0% sodium chloride (75 g)
94.5% deionized water (1417.5 g)

The white, gray and brown algin dispersions were each converted to particles in the following manner. A 400 g aliquot of the gelling salt solution was placed in a 1000 ml beaker and agitated with a Vibro-mix stirrer at high frequency. The pigment/alginate dispersion was slowly poured into the salt solution over a period of several minutes. After approximately 20 seconds, the mixer was turned off. The particle suspension thus formed was transferred to a 4000 ml beaker and diluted to about 3000 ml with deionized water. After the particles had settled, the water was decanted and the procedure repeated an additional three times at which point the particles were relatively free of chlorides. The particles were then filtered to remove excess water.

A multicolor coating of the following composition and having a Brookfield viscosity of 1100 cps was prepared in an acrylic clear coat base using the previously prepared three varieties of gel particles:

16.67% white particles; 166.7 g
16.67% gray particles; 166.7 g
16.67% brown particles; 166.7 g
50% acrylic clear coat; 500 g Using a 7" Byrd blade with an opening of approximately 20 mils, drawdowns were made on the following substrates:

1. Mineral fiberboard ceiling tile; light teal background
2. Mineral fiberboard ceiling tile; dark teal background
3. Mineral fiberboard ceiling tile; white background
4. Metallic ceiling grid capstock; white background Aesthetically pleasing variegated visuals were obtained in all cases. The dark teal ceiling tile visual was most attractive and resembled natural granite.

EXAMPLE 2

Pigment containing sodium alginate dispersions were prepared as in Example 1 except that the following colored pigments were used:

Brown—2% by weight W-3247[e] Burnt Umber dispersed in 1% Kelgin MV

Violet—2% by weight W-5020[e] Permanent Violet in 1% Kelgin MV

Black—2% by weight W-7017[e] Carbon Black in 1% Kelgin MV

[e] Manufactured by Harshaw Chemical Company 14 liter batches of each of the above three dispersions were prepared.

A gelling salt solution of the following composition was also prepared:

0.5% by weight calcium chloride
1.25% by weight sodium chloride
98.25% by weight deionized water Gel particles of each of the above dispersions were prepared in the following manner:

Each of the pigment dispersions was pumped with a portion of the salt solution at a rate of 4 L/Minute through separate lines into opposing branches (180°) of a ½" plastic tee fitting. The third branch of the tee fitting (90° from feed streams) extended downwardly into a 1" I.D. polycarbonate tubing. A dispersion consisting of large gel particle masses suspended in the salt solution was thus obtained. After a waiting period of about ½ hour, the dispersion was poured through a Comomil size reduction unit (Quadro Engineering) fitted with a screen having 0.094" circular openings. The particle dispersion was then poured into the basket of a small centrifuge and continuously washed with a water spray for a period of 1 minute. The particles were spun an additional 5 minutes to remove excess water.

A coating composition was prepared by dispersing equal parts of each of the above three separately prepared particles in water thickened to a viscosity of 1300 cps with a modified guar gum thickening agent. On a wet weight basis, the ratio of total particles to thickener solution was 1:5. Using a Byrd blade film drawdown apparatus with an opening of about 20 mils, the coating was applied to a mineral fiber ceiling board having a white base coat. The final dried sample had an attractive variegated visual effect with three readily discernible colors. The particles were well adhered to the board and resistant to abrasion.

EXAMPLE 3

Particles were prepared using the continuous processing method substantially as described in Example 2 except that the salt solution consisted of 0.5% by weight calcium chloride rather than the mixed calcium chloride/sodium chloride used in Example 2. After washing and dewatering, it was found that these particles were more stable during storage compared to those prepared with the mixed salt system. The latter particles tended to soften and break down during storage.

EXAMPLE 4

In the two experiments (A and B) that comprise this example, products having different surface effects were produced by varying the concentration of pigment particles in the final coating composition.

A. Low Solids—Three separate colored dispersions (brown, gray and white) were prepared containing 2%, 2% and 4% pigment levels (by weight) respectively in a 1% solution of sodium alginate in water; and each dispersion was converted into particles as in Example 1. After gravity settling, deionized water washing and filtration, the solids levels of the particles were in the range of 4–5% by weight.

An acrylic resin-containing coating was prepared by blending 50% of a clear coat acrylic base polymer with 16.5% of each of the above three particles. On a weight basis, the ratio of total particles to clear coat was 1:1. This coating was applied to ceiling grid coil stock at the rate of 50 g/sq.ft. using a Byrd blade film applicator. The sample was forced dried in a convection oven and the end result was a variegated three-color visual coated grid essentially devoid of any surface texture.

B. High Solids—Two particles of separate color (white and platinum) were similarly prepared except that the pigment content of each of the dispersions was about 15% by weight. The particles were simultaneously washed and spun down in a centrifuge. The solids content was 45% by weight.

Using a clear coat as in Experiment A, a particle-containing coating was prepared by blending 67% of the clear coat base with 24% of the white colored particles and 9% of the platinum colored particles. This coating was spray applied onto a finished ceiling grid (light platinum color) at an application rate of 25 g/sq.ft. and force dried in a convection oven. A variegated platinum/white visual coated grid was obtained. In addition to the variegated color effect, the grid surface was textured.

The texture is believed to be a result of the high solids level of the particles which, in turn, results in less volume shrinkage of the particles upon drying. It should be pointed out that the high solids level of these particles was probably due to the centrifugation method of dewatering.

What is claimed is:

1. A method for imparting at least two different color effects on a substantially non-wicking material comprising:
    (a) preparing at least two algin dispersions, each of a different color and each being prepared by dispersing particles of at least one colored pigment in an aqueous solution of alginic acid or an alginic acid derivative to form an algin dispersion of one color;
    (b) preparing a gelling salt solution by mixing a salt of a polyvalent metal other than magnesium in water;
    (c) intimately contacting each of the algin dispersions prepared in step (a) with a portion of said gelling salt solution to produce at least two slurries of gel particles;
    (d) dispersing the variously colored gel particles to a concentration of 2–50% by weight in a liquid having a viscosity of 50–3000 cps to form a coating composition;
    (e) applying said coating composition to the surface of a substrate, said surface being essentially non-wicking; and
    (f) drying said coated surface.

2. The method of claim 1 wherein the salt of the polyvalent metal is calcium chloride.

3. The method of claim 1 wherein said gelling salt composition also contains a monovalent chloride salt.

4. The method of claim 3 wherein said monovalent chloride salt is sodium chloride.

5. The method of claim 1 wherein said algin dispersions contains sodium alginate.

6. The method of claim 1 wherein three differently colored algin dispersions are prepared.

7. The method of claim 1 wherein said substrate is a metal.

8. The method of claim 1 wherein said substrate is a fiberboard.

* * * * *